United States Patent [19]

Tonner

[11] 4,092,438

[45] May 30, 1978

[54] NON-DAIRY COFFEE WHITENER CONTAINING ACETATE SALT

[75] Inventor: George F. Tonner, Mission Hills, Calif.

[73] Assignee: Carnation Company, Los Angeles, Calif.

[21] Appl. No.: 792,205

[22] Filed: Apr. 29, 1977

[51] Int. Cl.$^2$ ............................................. A23D 5/00
[52] U.S. Cl. ................................... 426/601; 426/613; 426/656; 426/658
[58] Field of Search ............... 426/585, 601, 602, 613, 426/658, 656

[56] References Cited

U.S. PATENT DOCUMENTS

| | | | |
|---|---|---|---|
| 3,620,757 | 11/1971 | Ellinger | 426/565 |
| 3,695,889 | 10/1972 | Ingerson | 426/590 |
| 3,764,711 | 10/1973 | Melnychn et al. | 426/656 X |
| 3,935,325 | 1/1976 | Gilmore et al. | 426/613 |

OTHER PUBLICATIONS

"Atlas Emulsifiers for Coffee Whiteners" Atlas Chem. Ind., Inc., 1965, p. 11.
Knightly, W. H. The Role of Ingr. in the Form. of Coffee Whiteners, Food Technology, vol. 23, Feb. 1969, pp. 37-48.
Lampert, L. M. "Modern Dairy Products" Chem. Publ. Co., Inc. N. Y. 1965, p. 386.

*Primary Examiner*—Raymond N. Jones
*Assistant Examiner*—R. A. Yoncoskie
*Attorney, Agent, or Firm*—Eugene C. Ziehm; Robert D. Kummel

[57] ABSTRACT

Non-dairy coffee whiteners can be provided with stability to the thermal and acid stresses of coffee by incorporating a water-soluble acetate salt in the whitener. The acetate salt may be used as a total or partial replacement of conventional stabilizing salts generally used in whiteners. Acetate salts which may be used include sodium acetate, potassium acetate, calcium acetate and mixtures thereof, and may be added to the whitener as such or formed in situ during the preparation of the whitener.

13 Claims, No Drawings

NON-DAIRY COFFEE WHITENER CONTAINING ACETATE SALT

BACKGROUND OF THE INVENTION

The present invention relates to a non-dairy coffee whitener having excellent stability to the thermal and acid stresses of coffee. More particularly, the invention relates to a non-dairy coffee whitener containing a water-soluble acetate salt as a stabilizing and/or buffering agent.

In recent years, non-dairy coffee whiteners have become of increasng importance in the food industry because of their ability to whiten coffee and their economy, taste, ease of handling and excellent shelf life. Coffee whiteners are marketed in three physical forms: powdered, liquid and frozen. Most whiteners are fat emulsion products; the powdered product, prepared as an dried emulsion, forms a liquid emulsion on addition to aqueous media. Regardless of its physical form, most coffee whiteners contain the same essential ingredients, namely vegetable or animal fat, carbohydrate, protein, emulsifiers, and stabilizing and buffering salts. The level of these ingredients in the coffee whitener will vary depending on the physical form of the whitener and the particular formulation of a manufacturer. Set out below are typical coffee whitener formulations for both liquid and powdered whiteners, with a range of ingredients given for each.

| INGREDIENT | LIQUID WHITENER % by wt. | POWDERED WHITENER % by wt. |
| --- | --- | --- |
| Fat | 3.0–18.0 | 25–50 |
| Carbohydrate | 2.5– 6.0 | 35–65 |
| Protein | 1.0– 3.0 | 3–12 |
| Emulsifier | 0.3– 0.5 | 1– 5 |
| Stabilizer | 0.1– 0.2 | 0.5–3 |
| Stabilizing salt | 0.1– 1.5 | 0.5–3 |
| Color-Flavor | as needed | as needed |
| Water | q.s. to 100% | about 1 |

It is generally recognized that a stabilizing and buffering salt is an essential ingredient of coffee whiteners for it improves the colloidal dispersiblity of proteins and prevents protein coagulation (feathering) when the whitener is added to coffee. Thus, many coffees have a pH which is near the isoelectric point of the protein in the whitener. Unless the whitener contains a buffering agent, the protein will coagulate when the whitener is added to such a coffee, resulting in a breakdown of the whitener emulsion. Buffering salts prevent such protein coagulation for they hydrolyze to slightly basic solutions, thereby increasing the pH of the coffee above the isoelectric point of the protein. In addition, the stabilizing/buffering salt, to be useful in a coffee whitener, must not impart any undesirable taste or flavor to the whitener or the coffee.

Heretofore, the only materials known to possess the combination of properties necessary in a stabilizing-/buffering salt were certain phosphate and citrate salts, namely, mono- and dipotassium phosphate, disodium phosphate, tetrasodium pyrophosphate, sodium aluminum phosphate and sodium citrate. Of these, dipotassium phosphate and sodium citrate. Of these, dipotassium phosphate is most commonly used. However, some nutritionists are currently concerned that dietary phosphate intake may be excessive, and some consideration is presently beng given to restricting the use of phosphates in foods and beverages.

SUMMARY OF THE INVENTION

It has now been found that water soluble acetate salts can be used as the stabilizing/buffering salt in a non-dairy coffee whitener. Such acetate salts provide the whitener with excellent stability to the thermal and acid stresses of coffee and effectively prevent protein coagulation (feathering) when the whitener is added to coffee. Water soluble acetate salts which may be used include food grade sodium acetate, potassium acetate, calcium acetate and mixtures thereof. The acetate salt may be included in the whitener as such or may be formed in situ in the production of the whitener.

The water soluble acetate salt may be used as a total or partial replacement of the phosphate and citrate salts conventionally used as stabilizing/buffering agents in non-dairy coffee whiteners. The amount of acetate salt in the whitener will, of course, depend on the particular formulation of the product and the physical form of the whitener, but is present in amounts which effectively stabilize the whitener to the thermal and acid stress of coffee without imparting an undesirable taste or flavor to the whitener. The acetate salt may be used in powdered, liquid and frozen non-dairy coffee whiteners.

DETAILED DESCRIPTION OF THE INVENTION

The present invention provides an effective alternative, both functionally and organoleptically, to the use of conventional phosphate and citrate salts in non-dairy coffee whiteners. In accordance with this invention, the phosphate and citrate salts used as stabilizing/buffering agents in non-dairy coffee whiteners are replaced, in whole or in part, with a food grade water soluble acetate salt. It has been found that the water soluble acetate salts of this invention are effective in stabilizing powdered, liquid and frozen whiteners to the thermal and acid stresses of coffee to prevent protein coagulation when the whitener is added to coffee. The water soluble acetate salts have been found to be more effective than citrate salts as the stabilizing/buffering agent in a non-dairy coffee whitener.

Water soluble acetate salts which may be used in the present invention are those salts of acetic acid which hydrolyze in an aqueous medium to form a basic solution and which do not, upon hydrolysis, yield ions or compounds which would impart an undesirable taste or flavor to the whitener or to the coffee to which the whitener is added. Such acetate salts which may be used must, of course, be of food grade, and include sodium acetate, potassium acetate, calcium acetate and mixtures thereof.

As noted hereinabove, the amount of stabilizing/buffering salt used in non-dairy coffee whiteners will vary depending on the physical form of the whitener and a manufacturer's particular formulation. Generally, liquid and frozen whiteners contain about 0.1% to 1.5% by weight of stabilizing/buffering salt, while powdered whiteners usually contain about 0.5% to 3% of this ingredient. The water soluble acetate salt of this invention may be used as a total or partial replacement of the phosphate and citrate salts conventionally used as stabilizing/buffering agents in powdered, liquid and frozen coffee whitener formulations. That is, all of the phosphate and citrate salt may be replaced with acetate salt so that the acetate salt is the sole stabilizing/buffering salt in the whitener. Alternatively, only a portion of the phosphate or citrate salt may be replaced with the acetate salt so that the acetate salt is used in combination with the conventional stabilizing/buffering salts. Replacement of conventional phosphate and citrate salts in the whitener formulation with acetate salt is on an equal weight basis in order to provide similar functionality. For example, in a powdered coffee whitener containing 2% by weight dipotassium phosphate as the stabilizing-/buffering salt, all of the phosphate salt may be replaced with an equal amount by weight of acetate salt. If desired, only a portion of the conventional stabilizing-/buffering salt may be replaced with an equal amount by weight of acetate salt. Thus, the amount of acetate salt in the whitener formulation may range from a trace, where is it used in combination with another stabilizing-/buffering salt, to the entire replacement of the phosphate and citrate salts conventionally used in non-dairy coffee whiteners, that is up to about 1.5% by weight in liquid and frozen whiteners and up to about 3% by weight in powdered whiteners. However, as with conventional phosphate and citrate stabilizing salts, the use of acetate salt at a level in excess of that needed to buffer the whitener may impart an undesirable taste or flavor to the whitener and should be avoided. Because of such taste and flavor considerations, it is generally preferred to limit the amount of acetate salt in the whitener formulation to about 2% by weight.

The acetate salt may be added to the whitener formulation as such or may be formed in situ in the production of the whitener by the reaction of acetic acid and a suitable base, such as hydroxides and carbonates of sodium, potassium and calcium. The in situ formation of the acetate salt will proceed under the conditions used in the preparation of non-dairy coffee whiteners. Generally, it is preferred to add the acetic acid and the base to the water used in the whitener formulation prior to the addition of the other ingredients, and prior to the application of external heat. If HCl casein is used as the protein in the whitener, an amount of base in excess of that required for acetate salt formation may be used in order to solubilize the HCl casein and form caseinate. The coffee whitener of this invention may be prepared by the procedures which are commonly used in the preparation of non-dairy coffee whiteners.

A wide variety of non-diary coffee whitener formulations is known and can be used in conjunction with the acetate salt stabilizing/buffering agent of this invention. Generally, non-dairy coffee whiteners comprise vegetable fat, protein, carbohydrate, and emulsifiers in addition to the stabilizing/buffering salt. These various components provide a considerable number of variations depending on the desired quality and body characteristics of the product and/or the physical form of the whitener.

The level of fat in the whitener can vary from about 3% to 18% by weight in liquid and frozen products, and from about 25% to 50% by weight in powdered whiteners. A wide variety of vegatable and/or animal fats may be used, but should have a bland or neutral flavor and long term stability toward oxidation. Examples of fats which may be used include partially or fully hydrogenated coconut oil, cottonseed oil, corn oil, soybean oil, peanut oil and the like.

Protein is present in the whitener in amounts of from about 1% to 3% by weight in liquid and frozen whiteners and from about 3% to 12% by weight in powdered whiteners. Suitable proteins which are used include sodium caseinate, potassium caseinate, calcium caseinate, soybean proteinate, and the like.

Carbohydrate is present in the whitener in amounts of from about 2.5% to 15% by weight in liquid and frozen whiteners and from about 35% to 65% by weight in powdered whiteners. Generally, corn syrup solids, sucrose, lactose are used.

Emulsifiers which may be used are those which are approved for use in foods, such as mono- and diglycerides, glycerol monostearates, sorbitan esters of hexitol anhydrides, and the like, and combinations thereof. The amount of emulsifer used may vary from about 0.3% to 1.0% by weight in liquid and frozen whiteners and from about 1% to 5% by weight in powdered whiteners.

A stabilizer such as carboxymethylcellulose, alginates, guar gum, locust bean gum, and the like may also be included in the whitener, if desired. Typically it is present in an amount of from 0.1% to 0.2% by weight in liquid and frozen whiteners and from 0.5% to 3% by weight in powdered whiteners. Such stabilizers serve to improve the colloidal solubility of the protein and control the body and viscosity of the whitener.

The following examples are provided to illustrate the invention. All parts and percentages are by weight unless otherwise specified.

EXAMPLE I

A powdered non-dairy coffee whitener of the present invention is produced by preparing an aqueous emulsion concentrate containing the ingredients listed below, spray drying the emulsion concentrate and instantizing the dried powder.

| INGREDIENT | % by Wt. |
| --- | --- |
| Vegetable Fat | 20.7 |
|    hydrogenated coconut oil | |
| Carbohydrate | 35.6 |
|    corn syrup solids | |
| Protein | 1.8 |
|    sodium caseinate | |
| Emulsifier | 1.2 |
|    diacetyl tartaric ester of | |
|    mono- and diglycerides | |
|    monoglycerides from glycerolysis | |
|    of edible fats | |
|    mono- and diglycerides of | |
|    fat forming fatty acids | |
| Stabilizing/Buffering Salt | 1.2 |
|    sodium acetate | |
| Water | 39.5 |

In preparing the emulsion concentrate, the fat and emulsifier mixture are melted together and held at about 160° F. Sodium acetate, the protein and corn syrup solids are added to another vessel containing the water at about 180° F. and agitated to dissolve and/or disperse the solids. The fat-emulsifier blend is then added, with agitation, to the aqueous mixture. The resulting mixture is then pasteurized at a temperature of 160° F. for about 20 minutes and homogenized in a two-stage homogenizer, the first stage being operated at about 2500 psi, and the second at about 500 psi to completely emulsify the mix and form a stable emulsion concentrate. The liquid emulsion concentrate is then spray dried, mixed with a small amount (about 0.15%) of an anticaking agent such as sodium silico aluminate, and instantized according to conventional procedures. The powdered whitener produced by this procedure contains about 34% fat, 58% carbohydrate, 3% caseinate, 2% emulsifier and 2% sodium acetate. This product gives excellent whitening in coffee and readily disperses in coffee with no feathering or free fat. The flavor of the powdered whitener containing sodium acetate as the stabilizing/buffering agent is comparable to conventional commercial whiteners containing dipotassium phosphate. The acetate-containing whitener has a slightly more, but not objectionable, degree of sourness than the phosphate-containing whitener.

EXAMPLE II

The procedure of Example I was repeated with the exception that sodium acetate was formed in situ in the liquid emulsion concentrate. In this procedure, stoichiometric amounts of glacial acetic acid and sodium hydroxide are added to the water in an amount sufficient to provide the liquid emulsion concentrate with about 1.2% by weight of sodium acetate. The powdered whitener, which contains about 2% sodium acetate has properties and characteristics substantially identical to the product of Example I.

EXAMPLE III

In order to determine the effectiveness of acetate salts in stabilizing coffee whiteners to the thermal and acid stresses of coffee, an acetate-containing powdered coffee whitener was compared for feathering stability against a commercially available powdered coffee whitener. The commercial product contained 3% sodium caseinate as the protein and 2% dipotassium phosphate as the stabilizing/buffering agent. This commercial product was compared against a whitener of the present invention which also contained 3% sodium caseinate as the protein but contained 2% sodium acetate as the sole stabilizing/buffering agent, the product being prepared by the procedure of Example I. The stability test consisted of adding 2.5 grams of powdered whitener to 97.5 grams of a coffee solution (prepared by adding 2 grams of a commercial freeze dried coffee to 95.5 grams of warm water) and heating the whitened coffee solution until feathering occurred. With the commercial whitener (containing phosphate salt) no feathering occurred until the coffee solution was heated to the temperature range of 190°-207° F. It was found that the whitener containing sodium acetate as the stabilizing/buffering salt also did not feather until the coffee solution was heated to the temperature range of 190°-207° F. This shows that the stability of the acetate-containing whitener of this invention is equal to that of currently available commercial whiteners.

While the above examples have been directed to the use of acetate salt in a powdered whitener, it will be understood that the acetate salts are equally as effective as a stabilizing/buffering agent in liquid and frozen whiteners. Such liquid and frozen whiteners containing acetate salt as the stabilizing/buffering salt may be prepared by the procedures generally used in the production of such whiteners. For example, the dry ingredients are blended with the fat and liquid ingredients and the mix is heated to pasteurizing temperature. The pasteurized mix is pumped to a homogenizer and homogenized at 2,000 to 2,500 total p.s.i. to form a stable liquid emulsion. If a liquid whitener is desired, the homogenized product is rapidly cooled to about 38° F. and stored under refrigeration. If a frozen whitener is desired, the homogenized product is rapidly cooled to below its freezing point in a non-quiescent manner.

What is claimed is:

1. In a non-dairy coffee whitener containing fat, protein, carbohydrate, emulsifier and an amount of stabilizing salt sufficient to stabilize the whitener to the thermal and acid stresses of coffee without imparting an undesirable taste or flavor to the whitener, the improvement wherein at least a portion of the stabilizing salt is an effective amount of a water soluble acetate salt.

2. The coffee whitener defined in claim 1 in which the acetate salt is selected from the group consisting of sodium acetate, potassium acetate, calcium acetate and mixtures thereof.

3. The coffee whitener defined in claim 2 in which the acetate salt is the sole stabilizing salt in the whitener.

4. The coffee whitener defined in claim 3 in which the whitener is in liquid or frozen form and the acetate salt comprises from about 0.1% to 1.5% by weight of the whitener.

5. The coffee whitener defined in claim 3 in which the whitener is in powdered form and the acetate salt comprises from about 0.5% to 3% by weight of the whitener.

6. The coffee whitener defined in claim 2 in which the stabilizing salt comprises a combination of the acetate salt and a salt selected from the group consisting of mono- and dipotassium phosphate, disodium phosphate, tetrasodium pyrophosphate, sodium aluminum phosphate and sodium citrate.

7. The coffee whitener defined in claim 1 in which the whitener is in liquid or frozen form and comprises from 3% to 18% by wt. of fat, from 1% to 3% by wt. of protein, from 2.5% to 15% by wt. of carbohydrate, from 0.3% to 1.0% by weight of emulsifier and from 0.1% to 1.5% by weight of stabilizing salt, at least a portion of said stabilizing salt comprising an effective amount of acetate salt selected from the group consisting of sodium acetate, potassium acetate, calcium acetate and mixtures thereof.

8. The coffee whitener defined in claim 1 in which the whitener is in powdered form and comprises from 25% to 50% by weight fat, from 3% to 12% by weight protein, from 35% to 65% by weight carbohydrate, from 1% to 5% by weight emulsifier and from 0.5% to 3% by weight of stabilizing salt at least a portion of which is an effective amount of acetate salt selected from the group consisting of sodium acetate, potassium acetate, calcium acetate and mixtures thereof.

9. In a method of preparing a non-dairy coffee whitener having stability to the thermal and acid stresses of coffee by forming an aqueous emulsion containing fat, protein, carbohydrate, emulsifier and stabilizing salt, the improvement which comprises including in the aqueous emulsion as the stabilizing salt, an effective amount of a water soluble acetate salt selected from the group consisting of sodium acetate, potassium acetate, calcium acetate and mixtures thereof, alone or in combination with a phosphate or a citrate salt.

10. The method defined in claim 9 in which the acetate salt is the sole stabilizing salt in emulsion and is present in an amount sufficient to stabilize the whitener to the thermal and acid stresses of coffee without imparting an undesirable taste or flavor to the whitener.

11. The method defined in claim 10 in which the aqueous emulsion contains from 0.1% to 1.5% by weight of said acetate salt.

12. The method defined in claim 10 in which the aqueous emulsion is dried to provide a powdered coffee whitener which contains from 0.5% to 3% by weight of the acetate salt.

13. The method defined in claim 9 in which acetic acid and a base selected from the group consisting of hydroxides and carbonates of sodium, potassium and calcium are added to the aqueous emulsion to form the acetate stabilizing salt in situ.

* * * * *